April 19, 1938. H. J. VENEDIGER 2,114,582
TWO-STROKE INTERNAL COMBUSTION ENGINE
Filed March 27, 1936  3 Sheets-Sheet 1

Inventor:

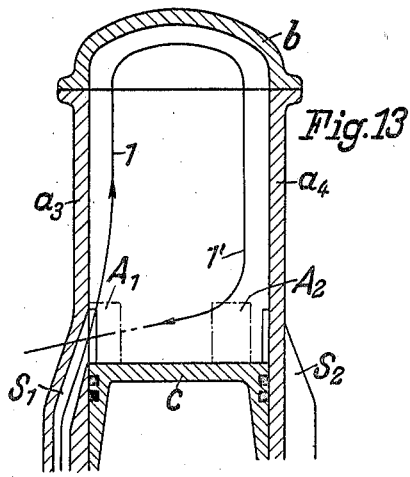
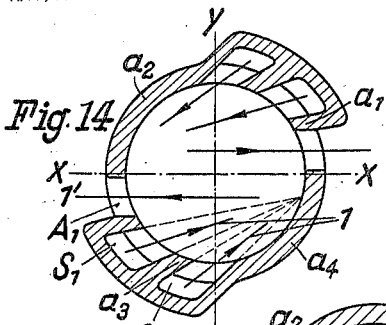
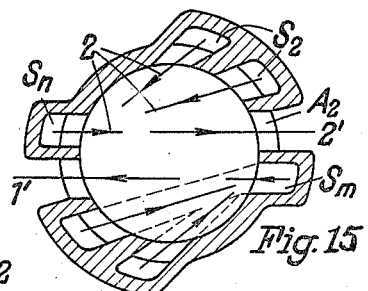
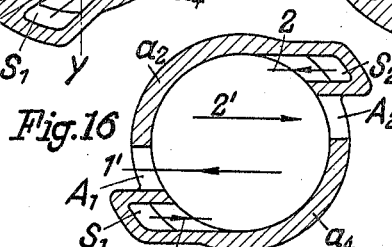
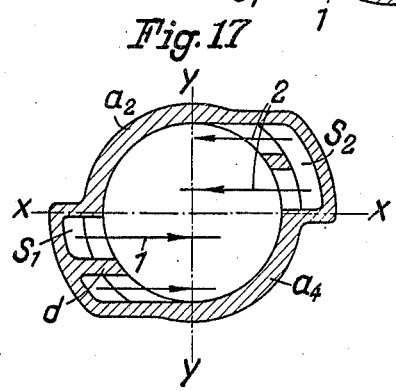
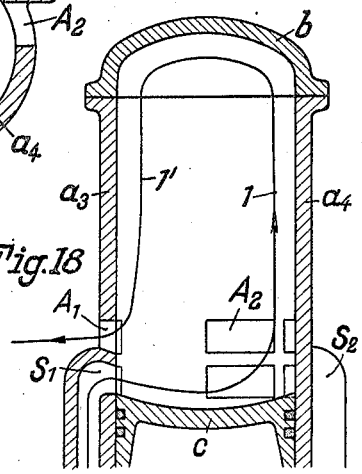

Patented Apr. 19, 1938

2,114,582

UNITED STATES PATENT OFFICE 2,114,582

TWO-STROKE INTERNAL COMBUSTION ENGINE

Herbert Josef Venediger, Chemnitz, Germany, assignor to Auto Union Aktiengesellschaft, Chemnitz, Germany Application March 27, 1936, Serial No. 71,293
In Germany March 28, 1935

8 Claims. (Cl. 123—65)

This invention relates to two-stroke internal combustion engines and has for its object to provide an improved arrangement of scavenging and outlet passages controlled by the engine piston.

The invention consists in arranging at each side of a plane disposed in the longitudinal axis of each cylinder, a scavenging passage and an outlet passage, the scavenging passage on one side of said plane being parallel and oppositely disposed with respect to the passage lying on the opposite side of said plane.

By this arrangement each half of the cylinder is effectively scavenged without interference between the scavenging streams circulating in the two halves of the cylinder lying on opposite sides of said longitudinal plane. Since the inflowing and outflowing scavenging streams flow closely side by side so as to cover the whole of the corresponding part of the cylinder space, there is obtained an eddy of the streams circulating at right angles to the axis of the cylinder flowing over the piston head as well as the cylinder head. A quantity of fuel injected into the cylinder during the scavenging operation or during the compression stroke or already contained in the scavenging medium is taken up by the scavenging streams distributed over the whole space of the cylinder since eddy effect continues over the whole period of the compression stroke.

An essential advantage is that the fuel is distributed particularly in the axial direction, that is to say, is kept away from the cylinder walls and is not deposited whereby it may escape combustion.

A further feature of the invention resides in the fact that the outlet passage at one side of said longitudinal plane is disposed oppositely with respect to the outlet passage lying on the other side of said plane.

In the accompanying drawings wherein several embodiments of the invention are illustrated:—

Fig. 13 is a longitudinal section through the cylinder showing the scavenging and outlet passages arranged side by side and steeply inclined upwardly.

Figs. 14 and 15 are cross sections of further modifications of the invention.

Fig. 16 is a cross section through a cylinder wherein the scavenging passage of one half of the cylinder is arranged directly beside the outlet passage of the same half.

Fig. 17 is a cross section through a cylinder wherein the outlet and scavenging passages are arranged one over the other.

Fig. 18 is a longitudinal section of the arrangement shown in Fig. 17.

Figure 1:
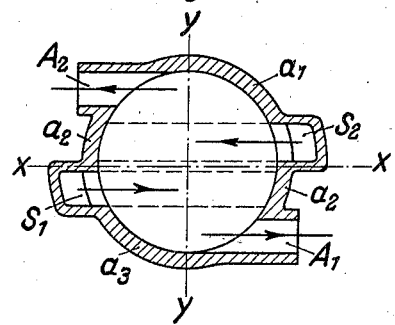
Figure 1 is a transverse sectional view through the cylinder of a two-stroke internal combustion engine illustrating the invention.

In all the figures X—X is a longitudinal plane of the cylinder, Y—Y is a longitudinal central plane at right angles thereto; $a_1$, $a_2$, $a_3$, $a_4$ are the parts of the cylinder wall divided off by these planes. The outlet passages are indicated by $A_1$, $A_2$ and so forth and the scavenging passages by $S_1$, $S_2$ and so forth; $b$ is the cylinder head and $c$ the piston. In the figures in most cases only one scavenging passage is shown for each half of the cylinder. It is obvious that a number of such passages can be provided, for which reason reference is made briefly to scavenging passage groups. The scavenging streams entering the cylinder through the scavenging passages are indicated by the numerals 1 and 2. The scavenging streams, on the other hand, are indicated by 1' and 2' when they have already passed the highest point in the cylinder and are about to approach the outlet passages so as to flow out. In other words, 1 and 2 are the inflowing and 1' and 2' the outflowing scavenging streams. All the cylinder cross-sections in the drawings are so taken that they pass through the outlet and scavenging passages arranged at the lower dead center point.

Figure 2:
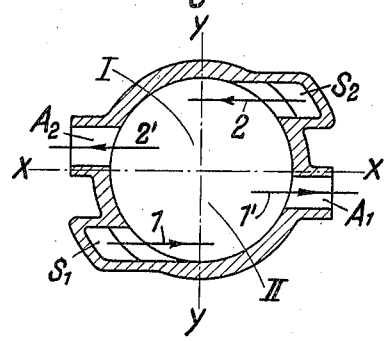
Figs. 2 and 3 are similar views of modified forms of the invention.
Figure 3:
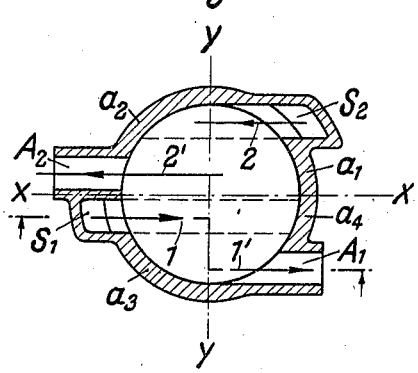
Figure 4:
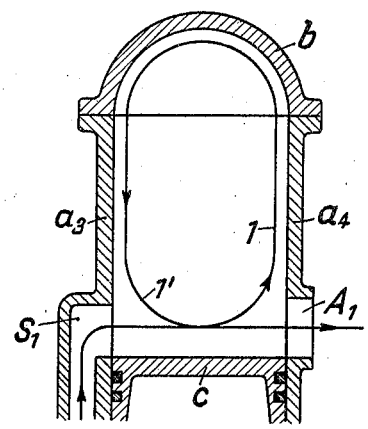
Fig. 4 is a fragmentary longitudinal sectional view through the cylinder, cylinder head and piston, the section being taken in the plane of two opposed scavenging and outlet passages.

Figs. 1-4 show a constructional example of the invention in which the outlet passages $A_1$, $A_2$ belonging to each scavenging passage group $S_1$, $S_2$ are arranged on the opposite side of the cylinder and are laterally offset with respect to the corresponding scavenging passage group. The scavenging currents 1 and 2 pass horizontally or with upward inclination over the piston $c$ up to the opposite cylinder wall $a_4$ or $a_2$ where they rise to the cylinder head, and after being reversed at the cylinder head $b$ flow along the cylinder walls $a_3$ or $a_1$ along to the piston $c$ and from there to the outlet passages $A_1$, $A_2$, as illustrated in Figs. 1 to 4. Fig. 4 shows a longitudinal section of Fig. 2 through the scavenging passage group $S_1$ and the outlet passage group $A_1$. In Figs. 1 and 2 all the scavenging and outlet passages lie symmetrically to the longitudinal planes X—X and Y—Y, but in Fig. 3 they are not symmetrical. As will be seen in the forms according to Figs. 1 and 2, the inflowing streams 1 and 2 and the outflowing streams 1' and 2' flow past one another. In the construction according to Fig. 3 the inflowing stream 1 of the scavenging passage group $S_1$ flows past the outflowing stream 2' of the scavenging passage group $S_2$.

Figure 5:
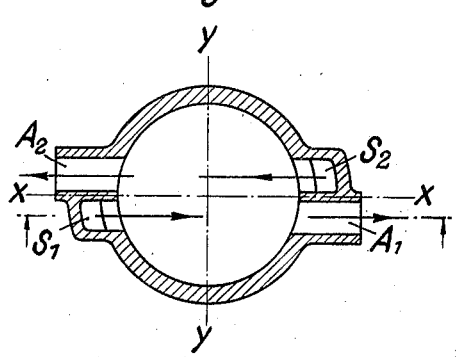
Fig. 5 is a view corresponding to Figs. 1 to 3 of a further embodiment of the invention.
Figure 6:
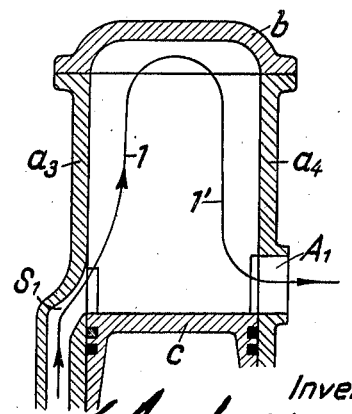
Fig. 6 is a fragmentary longitudinal section of the cylinder shown in Fig. 5.

Figs. 5 and 6 show another constructional form of the invention in which the outlet passage group belonging to each scavenging passage group is arranged on the opposite cylinder wall and the scavenging streams 1, 2 are guided along the inlet side of the cylinder head. The scavenging streams are guided upwardly either in a known manner by suitable inclination or shaping of the passages or by means of a deflector provided on the piston.

Figure 7:
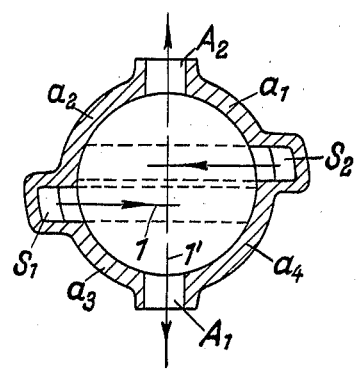
Fig. 7 is a transverse section of a further modification of a cylinder constructed in accordance with the invention.
Figure 8:
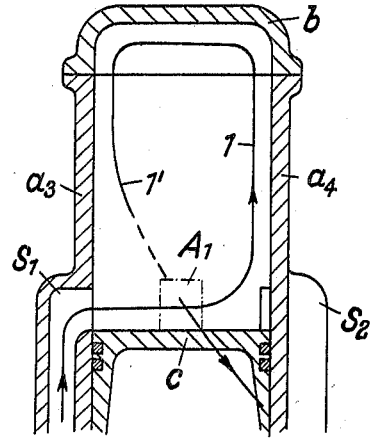
Fig. 8 is a longitudinal section of Fig. 7.

Figs. 7 and 8 show a further form of the invention in which the outlet passage groups $A_1$, $A_2$ lie opposite one another. The scavenging streams 1, 2 in Fig. 8 are guided across the piston horizontally or upwardly inclined to the opposite cylinder wall $a_4$ or $a_2$. Instead of this the scavenging streams could also be deflected towards the cylinder head $b$, that is, to flow upwardly along the inlet side, as already illustrated in Fig. 6.

Figure 9:
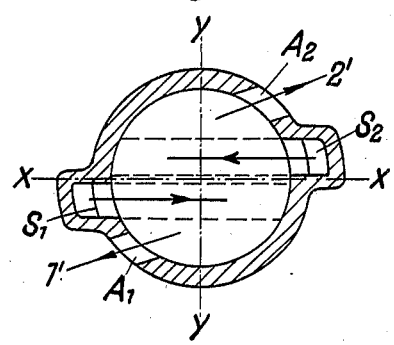
Figs. 9 and 10 are cross section of a cylinder wherein the scavenging and outlet passages of each half of the cylinder are arranged side by side.
Figure 11:
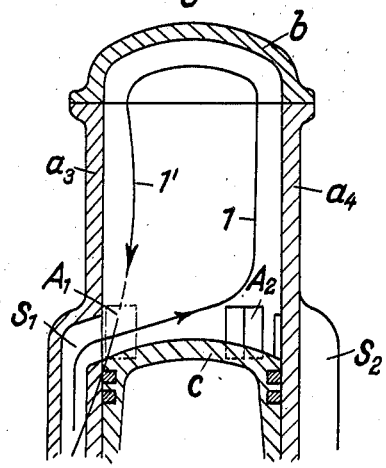
Fig. 11 is a longitudinal section of the cylinder shown in Fig. 9.

Figs. 9, 11 and 13 show another construction of the invention, such that the scavenging and outlet passage groups on each side of the cylinder are arranged side by side and the scavenging jets 1, 2 flowing in past one another are guided towards the opposite side walls $a_4$ or $a_2$ or also upwardly towards the cylinder head. The former case is shown in Fig. 11 and the latter in Fig. 13. It is quite clear how these longitudinal sections are taken. In Fig. 11 the scavenging passages $S_1$, $S_2$ may open into the cylinder horizontally or with an upward inclination.

Figure 12:
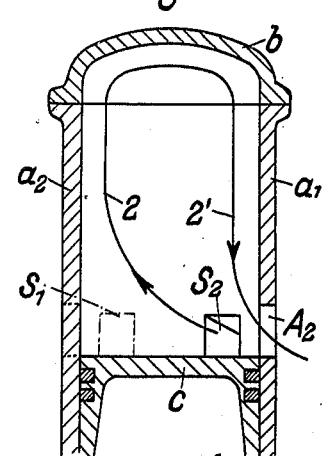
Fig. 12 is a longitudinal section of the cylinder shown in Fig. 10.

In Figs. 10, 12, 14, 15 and 16 constructions of the invention are illustrated in which the scavenging and outlet passage groups are arranged side by side in such a manner that the former guide the scavenging streams against the opposite cylinder walls or against the cylinder head in such a manner that the streams 1', 2' leaving the cylinder flow past one another. Fig. 12 shows a longitudinal section through the outlet passage groups $A_2$ and in this form of the invention the inflowing streams 1, 2 are guided horizontally or with upward inclination over the end of the piston to the opposite cylinder walls $a_4$ or $a_2$.

Figure 10:
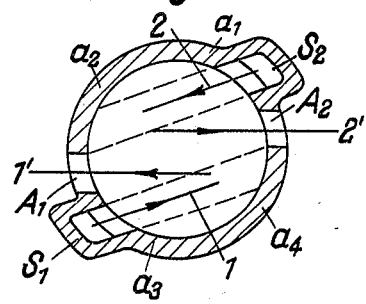

Figs. 14–16 show further variations of the constructions according to Figs. 10 and 12. In Fig. 14 as already previously mentioned a number of scavenging passages are combined in a group $S_1$ or $S_2$, which, in the case illustrated, preferably meet in a point near to the cylinder wall. In the construction according to Fig. 15, for example, at least one further scavenging passage $S_m$ or $S_n$ is provided lying opposite to the outlet passage $A_1$ or $A_2$, the scavenging stream of which preferably unites with the streams from its corresponding group of scavenging passages. The scavenging passages $S_m$ and $S_n$ preferably open into the cylinder with a steep upward inclination, while the groups $S_1$, $S_2$ may blow horizontally over the piston end.

A further construction is shown in Figs. 17 and 18. The outlet and scavenging passage groups take up about a quarter of the cylinder periphery, being arranged symmetrically to the longitudinal central plane X—X. They are arranged one above another according to Fig. 18, which shows a vertical section through the cylinder which passes through the outlet passage group $A_1$ and the scavenging passage group $S_1$. The streams 1, 2 are guided, as shown in Fig. 18 to the opposite cylinder walls $a_4$ or $a_3$ over the piston end, which is made flat or preferably concave. Instead of the parallel flow illustrated the streams 1, 2 could, of course, also converge as in Fig. 14 in such a manner that they would meet and unite inside or outside the cylinder or at the cylinder wall. It is also possible, as in Fig. 15, to provide further scavenging passages opening into the cylinder with a steep upward inclination.

The arrangement can be applied to all types of two-stroke internal combustion engines with crank case pumps or separate scavenging and charging devices. It is very suitable for two-stroke engines with injection of light, medium or heavy oil and the injection of the fuel can be effected at the end of the scavenging operation or during or at the end of the compression stroke.

If the injection nozzles, which are not shown in the figures, are arranged in the cylinder head instead of at other places they are preferably provided in the longitudinal plane X—X. They can, however, according to the type of fuel and the commencement of the injection, also be arranged in the cylinder wall or in one or more scavenging passages. If a fuel air mixture is being employed an ignition is naturally used in place of the injection nozzle.

What I claim is:—

1. A two-stroke internal combustion engine comprising a cylinder, a piston in said cylinder having an imperforate head, oppositely disposed and parallel scavenging passages communicating with said cylinder on opposite sides of a longitudinal axial plane of the latter, and an outlet passage communicating with said cylinder on each side of said plane.

2. A two-stroke internal combustion engine comprising a cylinder, a piston in said cylinder, oppositely disposed and parallel scavenging passages communicating with said cylinder on opposite sides of a longitudinal axial plane of the latter, and an outlet passage communicating with said cylinder on each side of said plane, the outlet passage disposed on one side of said plane being arranged opposite the scavenging passage on said side.

3. A two-stroke internal combustion engine comprising a cylinder, a piston in said cylinder having an imperforate head, oppositely disposed and parallel scavenging passages communicating with said cylinder on opposite sides of a longitudinal axial plane of the latter, and an outlet passage communicating with said cylinder on each side of said plane, the outlet passages being arranged in opposed relation.

4. A two-stroke internal combustion engine comprising a cylinder, a piston in said cylinder, oppositely disposed and parallel scavenging passages communicating with said cylinder on opposite sides of a longitudinal axial plane of the latter, and an outlet passage communicating with said cylinder on each side of said plane, the outlet passage disposed on one side of said plane lying adjacent the scavenging passages disposed on the opposite side of said plane.

5. An engine as claimed in claim 1 characterized in that a plurality of scavenging passages is provided on each side on said plane.

6. A two-stroke internal combustion engine comprising a cylinder, a piston in said cylinder, oppositely disposed and parallel scavenging passages communicating with said cylinder on opposite sides of a longitudinal axial plane of the latter, and an outlet passage communicating with said cylinder on each side of said plane, the scavenging and outlet passages disposed on one side of said plane being relatively offset.

7. A two-stroke internal combustion engine comprising a cylinder, a piston in said cylinder, oppositely disposed and parallel scavenging passages communicating with said cylinder on opposite sides of a longitudinal axial plane of the latter, and an outlet passage communicating with said cylinder on each side of said plane, the outlet passages being disposed outwardly of the scavenging passages with relation to the limit of the stroke of said piston.

8. A two-stroke internal combustion engine comprising a cylinder, a piston in said cylinder, oppositely disposed and parallel scavenging passages communicating with said cylinder on opposite sides of a longitudinal axial plane of the latter, and an outlet passage communicating with said cylinder on each side of said plane, the height of said scavenging passages decreasing outwardly from said plane.

HERBERT JOSEF VENEDIGER.